3,234,034
GLASS MAKING BATCH AND METHOD
John Jasinski and Joseph R. Monks, Toledo, Ohio, assignors to Owens-Illinois Glass Company, a corporation of Ohio
No Drawing. Filed Nov. 20, 1963, Ser. No. 325,147
5 Claims. (Cl. 106—54)

The present invention relates to a glass making batch and to a method of making such a glass making batch. More particularly, the present invention relates to the method of making a glass batch by the addition thereto of an aqueous solution of sodium hydroxide.

In the preparation of glass batches and in the melting of such glass batches to form molten glass, the finely divided, pulverant batch components may cause hazardous dust conditions. Such dust conditions may occur during the mixing of the batch or within the melter tank wherein the dry pulverant batch is reduced to molten glass. In either event serious health hazards may well arise, and severe damage to the batch forming, handling and melting equipment may occur, particularly within the regenerators or "checkers" of the melting furnace.

Consequently, it is extremely desirable to reduce dusting to a minimum and efforts to so reduce dusting in the mixing and conveying apparatus, and particularly within the melter (to reduce "checker carry-over") have been made. In the past, attempts to reduce such dusting have generally involved the addition of water to the batch, and some limited success has been attained by such measures.

The present invention now provides an improved technique for substantially reducing dusting and checker carry-over by the utilization of aqueous sodium hydroxide dispersions added to the batch prior to its melting. Further, the addition of the sodium hydroxide aids materially during the melting of the batch inasmuch as the aqueous sodium hydroxide dispersion is in intimate contact with the sand of the batch so as to readily render more easily meltable the sand component of the batch.

Additional benefits can be obtained by the utilization of aqueous dispersions of sodium hydroxide. For example, the raw batch tends to segregate as it is handled into and out of storage, and as it remains in storage. This effect is due to the presence of a plurality of different materials of different densities and of different particle sizes. The addition of an aqueous dispersion of sodium hydroxide inhibits and even prevents segregation.

Another example of the benefits of sodium hydroxide resides in the promotion of melting of the batch. The standard test is the "seed count" test, i.e., the determination of the number of "seeds" or extremely small gaseous inclusions per unit of glass. The smaller the seed count, the more efficient the melting. The seed count can be reduced (drastically by as much as two-thirds) by the use of aqueous sodium hydroxide additions.

It has been found that relatively small amounts of sodium hydroxide may be added to the batch, as little as fifteen pounds of sodium hydroxide per ton of sand having been found to be effective. Greater amounts of sodium hydroxide, i.e., up to about three-hundred pounds or even more can be utilized as desired, although extremely good results have been obtained by the utilization of from about fifteen to about twenty-five pounds of sodium hydroxide per ton of sand. Preferably, the sodium hydroxide is added as a concentrated aqueous solution, wherein the sodium hydroxide content may range from about twenty-five percent to seventy percent. For ease of handling, a fifty percent sodium hydroxide solution is to be preferred, such a concentration requiring the use of less solution than with more dilute solutions and being more readily handled by conventional fluid handling techniques than the more concentrated, semi-solid sodium hydroxide solutions.

In order to point out the advantages of the present invention, it should be noted from the data herein presented that, by comparison with the carry-over rate when water alone is added, the utilization of sodium hydroxide resulted in a carry-over rate reduction in the melter regenerators, on the average, of thirty-nine percent. Further, substantial decreases in the amount of dusting and batch segregation occurred during mixing, during discharge of the batch from the mixer to the batch-conveying apparatus and during dumping from the batch-conveying apparatus into the melting furnace hoppers, and hence to the melter proper. Although not exhaustively evaluated numerically, the batch was more easily meltable and the seed count was lowered after the addition of sodium hydroxide, and it was apparent that some sodium silicate was formed in the batch prior to its introduction into the melting furnace or tank, thereby indicating the intimate admixture of the sand of the batch and the sodium hydroxide.

It is, therefore, an important object of the present invention to provide a new and improved glass making batch and a method of making such a batch having, as one of its constituents, sodium hydroxide as a concentrated aqueous dispersion.

Another important object of this invention resides in the provision of a method of making a glass making batch containing sand by the addition to the batch of a concentrated sodium hydroxide solution to reduce dusting and segregation within the batch and to promote the dust-free, rapid melting of the batch.

It is a further important object of this invention to provide an improved glass making batch, containing glass forming ingredients, colorants and the like and having incorporated therein a sodium hydroxide solution of at least twenty-five percent sodium hydroxide concentration, the sodium hydroxide being intimately admixed with the batch to reduce the dusting and segregation tendencies of the batch and to promote the subsequent melting thereof.

In the practice of the present invention, the glass batch is basically that calculated to yield a molten glass having the theoretical analysis set forth in Table I, as follows:

TABLE I

| Oxide: | Percent by weight |
|---|---|
| $SiO_2$ | 60–75 |
| $Al_2O_3$ | 0.1–10 |
| CaO | 6–14 |
| BaO | 0–1.0 |
| $B_2O_3$ | 0–5 |
| MgO | 0–8 |
| $Na_2O$ | 10–20 |
| $K_2O$ | 0–3 |

In addition to this theoretical analysis, the basic batch may include various colorant ingredients, such as oxides of copper, cobalt or iron, sodium dichromate, or the like. However, the present invention is concerned primarily with the soda lime, flint glass batches falling within the range of oxide content set forth in Table I and suitable for the manufacture of containers or the like articles.

A specific batch composition to which the sodium hydroxide solution additions herein proposed have been made is set forth in Table II, this batch upon melting yielding a molten glass having the theoretical composition set forth in the following Table III:

TABLE II.—AMBER

Ingredients: Parts by weight, lbs.
- Sand _____ 2000
- Soda ash _____ 741
- Limestone _____ 637
- Feldspar _____ 267
- Gypsum _____ 14
- Iron pyrite _____ 6.5
- Sea coal _____ 6.5

TABLE III.—AMBER THEORETICAL COMPOSITION

Components: Percent by weight
- $SiO_2$ _____ 71.1
- $Al_2O_3$ _____ 1.87
- $CaO$ _____ 11.66
- $MgO$ _____ .08
- $Na_2O$ _____ 14.92
- $K_2O$ _____ .13
- $Fe_2O_3$ _____ .175

Another suitable glass batch composition and to which sodium hydroxide solution additions have been made is set forth in Table IV, this batch upon melting yielding a glass having a final theoretical composition set forth in Table V:

TABLE IV.—FLINT BATCH

Ingredients: Parts by weight, lbs.
- Sand _____ 2000
- Soda ash _____ 664
- Limestone _____ 665
- Feldspar _____ 272
- Gypsum _____ 22

TABLE V.—FLINT THEORETICAL COMPOSITION

Components: Percent by weight
- $SiO_2$ _____ 72.0
- $Al_2O_3$ _____ 1.89
- $CaO$ _____ 12.16
- $MgO$ _____ 0.12
- $Na_2O$ _____ 13.64
- $K_2O$ _____ 0.13

To illustrate the effectiveness of the addition of sodium hydroxide solutions in reducing the carry-over of air-floatable pulverant materials, particularly during the melting process, a water cooled metallic plate having an exposed upper surface thirty-six square inches in area was positioned within the melter regenerator checkers through one of the regenerator ports. The plate was removed at the conclusion of each test and the deposit on the top surface of the plate was weighed and analyzed to determine the extent and character of the resulting checker dust.

The indicated water and sodium hydroxide solution additions were made in the rotary batch mixer by sprinkling the water or aqueous solution through a fixed nozzle into a rotary mixer, and continuing the mixing until the water or aqueous solution was thoroughly admixed with the batch. Next, the batch was introduced into the melter in the usual manner, and melted therein with the indicated amount of material being deposited on the upper surface of the plate. Table VI sets forth the carry-over data for nine samples utilizing the batch of Table II, and Table VII sets forth the equivalent data when utilizing the batch of Table IV.

TABLE VI.—CARRY-OVER DATA

| Sample No. | Duration | Additive per ton of sand | Carry-over (grams/ton) of raw materials |
|---|---|---|---|
| 1 | 8 hrs | 58 lbs. water (7 gal.) | 0.097 |
| 2 | 24 hrs | do | 0.093 |
| 3 | 48 hrs | do | 0.78 |
| 4 | 72 hrs | do | 0.075 |
| 5 | 9 days | do | 0.078 |
| 6 | 4 days | do | 0.083 |
| 7 | 4 hrs | 25 lbs. NaOH–25 lbs. HOH (4 gal. 50% NaOH sol.) | 0.048 |
| 8 | 8 hrs | do | 0.056 |
| 9 | 2 days | do | 0.052 |

TABLE VII.—CARRY-OVER DATA

| Sample No. | Duration | Additive per ton of sand | Carry-over (grams/ton) of raw materials |
|---|---|---|---|
| 1 | 8 hrs | 58 lbs. water (7 gal.) | 0.063 |
| 2 | 15⅓ hrs | do | 0.225 |
| 3 | 48 hrs | do | 0.176 |
| 4 | 9 days | do | 0.212 |
| 5 | 10 days | do | 0.183 |
| 6 | 8 hrs | 25 lbs. NaOH–25 lbs. HOH (4 gal. 50% NaOH sol.) | 0.125 |
| 7 | 8 hrs | do | 0.103 |
| 8 | 8 hrs | do | 0.116 |
| 9 | 7 days | do | 0.121 |
| 10 | 8 hrs | do | 0.094 |
| 11 | 8 hrs | 15 lbs. NaOH–54.5 lbs. HOH (7 gals. 25% NaOH sol.) | 0.078 |
| 12 | 8 hrs | do | 0.061 |
| 13 | 3 days | do | 0.078 |

It will be noted from Tables VI and VII that the carry-over was sharply reduced by the utilization of aqueous sodium hydroxide solutions, even though as little as four gallons of solution was added, and even though as little sodium hydroxide as fifteen pounds per ton of sand was added.

In Tables VIII and IX a more direct carry-over comparison is provided, the carry-over here being expressed in grams per twenty-four hours of operation, rather than in grams per ton of raw materials, as in Tables VI and VII.

The date of Table VIII was obtained by utilization of the batch of Table II, while the date of Table IX was obtained by the use of the batch of Table IV. The percent reduction, from the data of Table IX is, on the average, thirty-nine percent and, in two instances, reductions of fifty percent were obtained.

TABLE VIII.—CARRY-OVER COMPARISON
[Samples numbered same taken on same dates]

| Sample | Additive | Carry-over (gr.) on 24 hrs. basis | Percent reduction |
|---|---|---|---|
| 1 | 7 gal. water | 18.3 | |
| 1 | 4 gal. 50% NaOH sol | 8.4 | 54 |
| 2 | 7 gal. water | 13.9 | |
| 2 | 4 gal. 50% NaOH sol | 10.8 | 22 |

TABLE IX.—CARRY-OVER COMPARISON
[Samples numbered same taken on same dates]

| Sample | Additive (A=7 gal. HOH) (B=4 gal. 50% NaOH sol.) | Carry-over (gr.) on 24-hrs. basis | Percentage of reduction |
|---|---|---|---|
| 1 | A | 45.0 | 43 |
| 1 | B | 25.8 | |
| 2 | A | 33.8 | 33 |
| 2 | B | 22.5 | |
| 3 | A | 37.0 | 39 |
| 3 | B | 22.5 | |
| 4 | A | 47.9 | 50 |
| 4 | B | 24.0 | |
| 5 | A | 39.0 | 23 |
| 5 | B | 30.0 | |
| 6 | A | 42.8 | 50 |
| 6 | B | 21.6 | |
| 7 | A | 43.5 | 36 |
| 7 | B | 27.9 | |
| Average | A | 41.2 | |
| Do | B | 24.9 | |
| Average reduction | | | 39 |

A direct comparison of the carry-over, so far as its chemical nature is concerned, is set forth in Tables X and XI. From Table X it will be observed that a substantial reduction was obtained upon the addition of twenty-pounds of water per ton of sand to the batch of Table II, while Table XI sets forth an analysis of the carry-over when utilizing the batch of Table IV. It will be noted that the primary reduction in carry-over occurs in the limestone, feldspar and sodium sulfate components of the batch.

TABLE X.—CARRY-OVER (AMBER)
[Grams/24 hours]

| Batch Material | Additive | |
|---|---|---|
| | None | 20 pounds water |
| Sand | 10.2 | 5.7 |
| Limestone | 7.7 | 4.2 |
| Feldspar | 11.0 | 4.7 |
| $Na_2SO_4$ | 15.9 | 9.2 |
| NaCl | N.D. | N.D. |
| $F_2$ | N.D. | N.D. |
| Excess $Na_2O$ | | |
| Residue | 2.2 | 1.9 |
| Total | 47.0 | 25.7 |

TABLE XI.—CARRY-OVER (FLINT)
[Grams/24 hours]

| Batch Material | Additive | | |
|---|---|---|---|
| | 7 gal. HOH | 7 gal. 25% NaOH sol. | |
| | | 1 | 2 |
| Sand | 7.9 | 9.0 | 7.1 |
| Limestone | 3.6 | 2.7 | 2.2 |
| Feldspar | 4.0 | 2.5 | 2.2 |
| $Na_2SO_4$ | 3.7 | 2.7 | 2.9 |
| NaCl | 1.1 | 1.0 | 1.0 |
| $F_2$ | 0.02 | 0.02 | 0.02 |
| Residue | .7 | 1.0 | 0.6 |
| Total | 21.0 | 18.9 | 16.0 |

In additional carry-over determination, a batch of the following composition was prepared:

TABLE XII

| Ingredient: | Percent by weight |
|---|---|
| Sand | 55.5 |
| Soda ash | 16.0 |
| Limestone | 3.7 |
| Raw dolomite | 17.5 |
| Nepheline syenite | 7.3 |

In the basic composition of Table XII, the soda ash content was partially replaced by sodium hydroxide so that the $Na_2O$ content of the batch remained constant. The original composition and the modified compositions were then melted under plant conditions in a conventional recirculatory melter furnace. A water cooled plate measuring 3 inches by 9 inches was located at the port floor level of the furnace, 18 inches from the side opposite the firing port. The relative carry-over was determined by weighing the material adherent to the water cooled plate.

It was found that:

A. The presence of 85.1 pounds of sodium hydroxide and 85.1 pounds of water per ton of sand in the batch reduced carry-over 25%;
B. The presence of 99.2 pounds of sodium hydroxide and of 99.2 pounds of water per ton of sand in the batch reduced carry-over 35%.

An additional effect to be obtained by the practice of the present invention is the reduction of segregation tendencies of the material, i.e., the tendency of the material to separate into its components in distinct layers, or "stria" as the material is handled or stored during the batch preparation and batch-feeding process in the glass plant.

The segregating effect occurs primarily because of the differences in the density and particle sizes of the various batch materials. Any segregation will affect uniformity of the batch as it is fed into the furnace, and segregation will result in the feeding of a non-uniform batch to the furnaces.

A batch is tested for its segregation tendencies by pouring a sample of the batch into a Plexiglas cell or container which is 10 inches deep by 3 inches wide by 24 inches long. If the batch segregates, the flow of the material into the cell will produce "stria" upon visual examination of the batch from the 10" x 24" side of the cell.

A batch of the composition set forth in Table XII was tested, the raw dolomite being of a particle size equivalent to −20 mesh. An addition of eighteen gallons of water (150 pounds) was required to prevent segregation. Using the same batch, fourteen gallons of a 50% solution of sodium hydroxide per ton of sand in the batch (99.2 pounds sodium hydroxide per ton of sand) prevented segregation.

In a batch of the same composition but containing dolomite of a size corresponding to −12 mesh twenty gallons of water (167 pounds) per ton of sand was required to prevent segregation. Segregation was prevented upon the addition of fourteen gallons of 50% solution of sodium hydroxide per ton of sand (99.2 pounds sodium hydroxide) to a ton of sand.

Thus, it has been demonstrated that the addition of sodium hydroxide, in an aqueous solution, is more effective in the prevention of segregation in the batch than the addition of water alone. The laboratory data above presented has been verified by actual plant experience.

A further effect of the addition of sodium hydroxide has been observed in the reduction of the seed count in a melted batch. A "seed" is an extremely small gaseous inclusion in the melted glass, and glass normally is melted and refined to a seed-free condition. Any reduction in the seed count during melting tests conducted within a given time indicates greater ease in melting of the batch and the requirement of less refining of the glass. Thus, the melting time and the refining time can be reduced, and greater output can be obtained from a given glass melting and refining furnace.

In the laboratory seed count tests are conducted by melting a basic batch for a relatively short period of time, pouring the sample from the batch and actually counting the number of gaseous inclusions or seeds. A basic batch of the following composition was prepared:

TABLE XIII

| Ingredient: | Percent by weight |
|---|---|
| Sand | 55.1 |
| Soda ash | 18.3 |
| Limestone | 18.4 |
| Feldspar | 7.5 |
| Gypsum | 0.7 |

In the following table (Table XIV), batch 1 corresponds to the basic batch, containing no water or sodium hydroxide; batch 2 contains 5% water; batch 3 corresponds to basic batch 1, in which sodium hydroxide has been substituted for the equivalent amount of soda ash to an amount equal to 124 pounds of sodium hydroxide per ton of sand; and batch 4 is the same as batch 3 with the exception that 248 pounds of sodium hydroxide was substituted per ton of sand.

One-hundred-fifty (150) grams of each batch was melted for thirty minutes at 2680° F., the sample was poured and the seeds were counted. The results were summarized in Table XIV as follows:

TABLE XIV

| Batch No.: | Seed per ounce |
|---|---|
| 1 | 210 |
| 2 | 136 |
| 3 | 62 |
| 4 | 65 |

These tests indicate that a batch containing sodium hydroxide contains remarkably fewer seeds per ounce than either the basic batch or a batch containing water.

From the data hereinbefore presented, it will be apparent that the present invention provides a means for substantially reducing the extent of dusting obtained during the preparation, conveying and melting of pulverant glass batches. As above explained, the aqueous sodium hydroxide solution is added to the batch during the mixing of the batch, or at any other stage of the batch preparation and conveying process prior to melting of the batch. Of course, to maintain a constant $Na_2O$ content in the final glass, the soda ash content of the batch is reduced in stoichiometric amount equivalent to the added NaOH.

Comparatively minute amounts of sodium hydroxide are utilized, preferably ranging from about fifteen pounds of sodium hydroxide per ton of sand to about fifty pounds of sodium hydroxide per ton of sand, although desirable results are obtained by the use of up to three-hundred pounds of sodium hydroxide per ton of sand, the sodium hydroxide being dissolved in water and the sodium hydroxide constituting about twenty-five to seventy percent of the solution added. Due to the handling difficulties of seventy percent sodium hydroxide, it is preferred that sodium hydroxide solutions at a concentration of from twenty-five percent to fifty percent be utilized. Preferably, the addition is made by conventional fluid handling techniques, and the amount of sodium hydroxide added is controlled by metering the added fluid. The amount of water added may range up to two hundred pounds per ton of sand in the batch. Obviously, water in addition to that added as the sodium hydroxide solvent may be added, preferably within the range of from forty to one-hundred-sixty pounds of water per ton of sand in the batch.

The drastic reduction in carry-over within the melting furnace as compared with a normal dry pulverant batch can be readily appreciated from a comparison of Tables X and XI, while the reduction when compared with an equivalent amount of water will be readily appreciated from a comparison of the materials of Tables VI through XI.

Although the most dramatic effect of sodium hydroxide addition is in the drastic reduction in carry-over, additional desirable results are obtained in the reduction of the segregating tendencies of the batch and in promoting the melting of the glass to a seed-free condition.

We claim:

1. A batch for making a glass having a theoretical composition within the following range:

| Components: | Percent by weight |
|---|---|
| $SiO_2$ | 60–75 |
| $Al_2O_3$ | 0.1–10.0 |
| CaO | 6–14 |
| BaO | 0–1.0 |
| $B_2O_3$ | 0–5 |
| MgO | 0–8 |
| $Na_2O$ | 10–20 |
| $K_2O$ | 0–3 | characterized by a part only of the defined alkali oxide content thereof being supplied as an aqueous solution of sodium hydroxide in an amount to provide from fifteen to fifty pounds of NaOH and from twenty to two hundred pounds of water per ton of sand in the batch.

2. In a method of making a glass by melting a batch containing sand, limestone and sodium carbonate, the steps of adding to the batch an aqueous dispersion of sodium hydroxide in an amount to yield a total water content of said batch of from twenty to two hundred pounds of water per ton of sand in the dry batch and a sodium hydroxide content of from fifteen to fifty pounds per ton of sand, mixing said dispersion thoroughly with the dry batch ingredients, introducing the mixed batch into the melting furnace and melting the batch.

3. In a method of making a glass by melting a batch containing sand, limestone and sodium carbonate, the steps of adding to the batch an aqueous dispersion of sodium hydroxide in an amount to yield a total water content of said batch of from twenty to two hundred pounds of water per ton of sand in the dry batch and a sodium hydroxide content of at least fifteen pounds per ton of sand, mixing said dispersion thoroughly with the dry batch ingredients, introducing the mixed batch into a melting furnace and melting the batch.

4. In the method as defined in claim 3, the further improvement in the step of adding to the batch the aqueous dispersion of sodium hydroxide in an amount to yield a sodium hydroxide content of from fifteen to three hundred pounds per ton of sand.

5. In the method as defined in claim 2, the further improvement in the step of adding to the batch the aqueous dispersion of sodium hydroxide in an amount to yield a sodium hydroxide content of from fifteen to three hundred pounds per ton of sand.

References Cited by the Examiner

UNITED STATES PATENTS

| 2,813,036 | 11/1957 | Poole | 106—52 |
| 3,065,090 | 11/1962 | Hopkins | 106—52 |
| 3,149,983 | 9/1964 | Maris et al. | 106—52 |

FOREIGN PATENTS

| 7,281 | 1837 | Great Britain. |
| 2,284 | 1870 | Great Britain. |
| 888,639 | 4/1959 | Great Britain. |

TOBIAS E. LEVOW, *Primary Examiner.*